3,325,415
EMULSION COMPOSITIONS
Edward Joseph Kenney, Bernardsville, and Garland George Corey, Milltown, N.J., assignors to Colgate-Palmolive Company, New York, N.Y., a corporation of Delaware
No Drawing. Filed May 7, 1965, Ser. No. 454,189
10 Claims. (Cl. 252—144)

This invention relates to new emulsion compositions characterized by enhanced stability against phase separation. More particularly, this invention relates to stable emulsions which are particularly suited for use in metal cleaning compositions and which substantially retard retarnishing of the cleaned metal surface under normal conditions of use.

Many metal cleaning compositions in emulsion form tend to "break," that is, some or all of the components separate out and/or the emulsion separates into phases upon storage or exposure to elevated temperatures. The result of this separation is that the emulsion components are no longer uniformly distributed. The consequences of this non-uniform distribution can be serious as, for example, in metal cleaning and polishing compositions where uniformity of distribution of the components is relied upon for optimum cleaning and polishing. Non-uniform distribution of metal cleaning components can lead to a slowly acting, ineffective metal cleaner and polisher, removable only with difficulty from a surface treated therewith.

Broadly, this invention contemplates a metal cleaning and polishing emulsion composition characterized by enhanced emulsion stability and comprising (a) an alkoxyl quaternary ammonium compound corresponding to the formula:

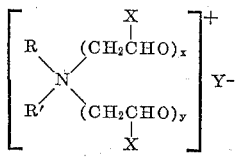

wherein R is an alkyl group of from about 12 to 18 carbon atoms, R' is an alkyl group of up to about 2 carbon atoms, X is selected from the group consisting of methyl and hydrogen radicals, $x$ and $y$ are integers of from 1 through 3, the sum of $x$ and $y$ being up to 4, and Y is an anion selected from the group consisting of methosulfate, ethosulfate, chloride, bromide, iodide, acetate and lactate, (b) an alkoxyl amine corresponding to the formula:

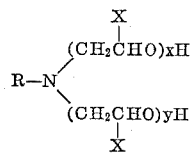

wherein R is an alkyl group of from about 8 to about 18 carbon atoms, X is selected from the group consisting of hydrogen and methyl radicals, $x$ and $y$ are integers of from 1 through 4, the sum of $x$ and $y$ being up to about 5, (c) an abrasive, (d) an acid having an ionization constant of from about $1 \times 10^{-5}$ to $1 \times 10^{-2}$, (e) a silicone oil slip agent, (f) a water-insoluble solvent system selected from the class consisting of hydrocarbons and halogenated hydrocarbons for said amine and said quaternary compound and for removal of grease from a metallic surface and (g) water.

The alkoxyl quaternary ammonium compound is one which contains an alkyl group of from about 12 to 18 carbon atoms on the cationic portion of the molecule.

Among the ethoxyl and propoxyl quaternary ammonium compounds which can be used in practicing this invention, the following may be mentioned: N-coco, N-methyl, N,N-di-propoxyl methosulfate; N-hexadecyl, N-ethyl, N,N-di-propoxyl ethosulfate; N-dodecyl, N-methyl, N,N-di-ethoxyl methosulfate and the ilke.

Suitably, the alkoxylated quaternary ammonium compound can be present in amounts of from about 0.7 percent to about 5.0 percent based on the weight of the entire composition. Although an amount less than 0.7 percent may be used, such a lesser amount would not be as effective in preparing a metal cleaning and polishing emulsion as would an amount of at least about 0.7 percent. Amounts in excess of 5.0 percent may also be used if desired.

The alkoxyl amine used in practicing this invention has an alkyl group of from 8 to 18 carbon atoms.

Among the alkoxyl amines which may be used are N-tiethoxyl, N-diethoxyl stearyl amine; N-diethoxyl, N-triethoxyl dodecyl amine; N-tripropoxyl, N-dipropoxyl octyl amine; N-tetraethoxyl, N-ethoxyl decyl amine, other alkoxyl amines, such as ethoxylated or propoxylated lauric amine, myristic amine, palmitic amine, stearic amine, oleic amine, linoleic amine, and the like.

When preparing the metal cleaning and polishing emulsions according to this invention, it is preferred that the alkoxyl amine be dissolved in a water-immiscible solvent or solvents and that the alkoxyl quaternary compound be dissolved next in this solution.

However, the order of addition of the amine and quaternary compound may be reversed or they may be added to the solvent simultaneously.

The water immiscible solvent or mixture of solvents is present in amounts of from about 9 percent to about 25 percent based upon the weight of the entire composition. Although amounts of less than 9 percent or more than 25 percent can be used, care should be exercised in using such lesser or greater amounts due to the possibility of breaking the emulsion system or disturbing its stability.

Among the water immiscible liquids which may be used in practicing this invention are hydrocarbons and halogenated (e.g. chlorinated) hydrocarbons, such as kerosene, odorless mineral spirits, Stoddard solvent, toluene, xylene, naphthalene, decahydronaphthalene, carbon tetrachloride trichloroethylene, tetrachlorethane, high-flash coal tar naphtha, benzene, hexane, cyclohexane, and the like.

The water immiscible liquid or mixtures thereof, especially when a hydrocarbon or mixtures thereof are used, are not only effective in helping to establish the emulsion, but are also effective in removing grease and oil from a metallic surface.

The amount of water which may be present may vary from about 15 percent to about 60 percent based upon the weight of the composition.

A polishing abrasive is incorporated in the instant metal cleaning and polishing emulsion compositions. We prefer to use abrasive particles which are in the form of smooth platelets or smooth spheres having an average maximum diameter of from about 35 to 45 microns, as these are excellent polishing abrasives. The polishing abrasive used should comprise not more than about 60 percent by weight of the entire composition.

Among the polishing abrasives and their mixtures which can be used in practicing this invention are silica, bentonites, alumina, surface esterified alumina monohydrate, mixtures of surface-esterified alumina monohydrate and fine metallic oxides, iron oxide, titanium dioxide, Carborundum, volcanic ash, and the like.

A particularly preferred polishing abrasive are alumina particles having an average maximum diameter of about 39 microns and present in an amount of about 30 percent by weight of the entire composition as excellent cleaning and polishing results have been obtained therewith.

In a desirable embodiment, silica or bentonite is present, although they need not be present in order to form a stable emulsion. However, we have found that when one or both is present, the metal cleaning and polishing emulsion exhibits even further enhanced stability against phase separation.

When silica is present to enhance further the stability of the emulsion, it may be present in amounts of up to about 5 percent based on the weight of the entire composition. Amounts in excess of 5 percent may also be used. However, these greater amounts may adversely affect the viscosity of the emulsion. When a bentonite is present as a stability enhancer, it may be present in amounts of up to about 10 percent based on the weight of the entire composition.

The silica and/or bentonite used to enhance further the stability of the emulsion is added after all other components have been admixed. It is preferred that the stability-enhancing silica and/or bentonite be in the form of fine particles, e.g., smaller than 45 microns.

In a metal cleaning and polishing emulsion, a slip agent, such as a silicone oil, is present to assure ease of application to and ease of removal from a metallic surface. (For convenience, the silicone may be incorporated in emulsion form.)

The amount of silicone oil emulsion which can be used may vary widely. It is preferred, however, to use from about 1 to about 5 percent of silicone oil based upon the weight of the entire composition, although amounts in excess of 5 percent may be used if desired.

Exemplary of the silicones which may be used are the following as well as their mixtures: polysiloxane oil terminated with trimethyl silane, butylmethylsiloxane, dimethylsiloxanebenzylmethylsiloxane, dimethylsiloxane terminated with trimethylsilane, phenylmethylpolysiloxane terminated with trimethyl silane, and the like.

An acid is incorporated in the instant emulsion in order to enhance further its metal cleaning and polishing characteristics. Among the acids which may be used are those acids having an ionization constant of from about $1\times 10^{-5}$ to about $1\times 10^{-2}$, e.g., phosphoric acid, acetic acid, oxalic acid, and the like.

The amount of acid suitable for use in the metal cleaning and polishing emulsions of this invention may vary widely and is limited mainly by practical considerations. It has been found, however, that excellent results are obtained using a metal cleaning and polishing emulsion composition having acid present in an amount up to about 35 percent by weight of the entire composition.

Other components may also be present in the metal cleaning and polishing emulsion. Examples of such other components are dyes, perfumes, and the like. The only limitation on the ancillary components is that they must be compatible with the components already present. Cuch ancillary ingredients will be obvious to one skilled in the art.

The compositions of this invention are preferably prepared by first dissolving the alkoxyl amine in a water immiscible solvent, such as odorless mineral spirits. The alkoxyl quaternary compound is then added to the solution and dissolved therein. The abrasive is added to the solution next.

A separate mixture composed of water, acid, silicone oil emulsion and a dye, if present, is added to the abrasive-containing mixture while vigorously agitating said abrasive containing mixture. Agitation is continued until all of the aforesaid components have been blended with one another. Silica and/or bentonite may be added while agitating the aforesaid blended components.

The emulsions of this invention may be in the form of a paste or liquid. In order to illustrate more fully the nature of this invention and the manner of practicing the same, the following example is presented. All percentages are by weight, based on the weight of the entire composition, unless otherwise specified.

EXAMPLE

This example demonstrates the preparation and stability of a metal cleaning and polishing composition of this invention. The components and amounts used are as follows:

| | Percentage |
|---|---|
| N-triethoxyl, N-diethoxyl stearyl amine | 2.2 |
| N-coco, N-methyl, N,N-dipropoxyl ammonium methyl sulphate | 2.2 |
| Odorless mineral spirits [1] | 19.4 |
| Water | 27.3 |
| Phosphoric acid | 15.3 |
| Perfume | 0.1 |
| Dye | 0.3 |
| Silicone oil emulsion [2] | 3.0 |
| Alumina 39 microns (mainly alpha alumina with some gamma alumina) | 29.2 |
| Pyrogenic silica | 1.0 |

[1] The odorless mineral spirits used are paraffinic hydrocarbons distilling within the range of about 346° F. to about 405° F., having a specific gravity according to ASTM D-1250 of 0.7571 at 60/60° F. and a Tag. Closed Cup flash point of 124° F.

[2] The silicone oil emulsion is composed of 35% of a polysiloxane terminated with trimethyl silane of 10,000 centistokes viscosity and an average molecular weight of 50,000, 1.75% of an emulsifier and water as the balance.

The composition is prepared by first dissolving the amine and then the quaternary ammonium compound and perfume in the odorless mineral spirits via simple mixing. Alumina is then added to the solution and mixing is continued until a smooth appearance is obtained. A mixture of water, phosphoric acid, dye and silicone oil emulsion is then added to the continuously agitated alumina-containing mixture. Pyrogenic silica is then added to the composition while mixing and until the composition is homogeneous and smooth.

Two samples of the above prepared composition are placed in an oven, which is preset at a temperature of 120° F. and allowed to remain undisturbed at that temperature for more than 100 days. There is no visible separation of components at the conclusion of the test period.

The fact that the composition remains in the form of a stable emulsion at an elevated temperature for more than 100 days demonstrates the excellent stability of the compositions of this invention.

The metal cleaning and polishing emulsion compositions according to this invention are particularly advantageous in that they exhibit enhanced stability against phase separation. Additionally, the compositions are effective in cleaning and polishing metals without etching the metal. Furthermore, it has been found that the compositions according to this invention exhibit enchanced inhibitory action on the tarnishing of metals.

In the claims, all percentages are by weight, based on the weight of the entire composition.

While this invention has been described in terms of certain preferred embodiments and illustrated by a specific example, the invention is not to be construed as limited except as set forth in the following claims.

What we claim is:

1. A metal cleaning and polishing emulsion composition characterized by enhanced stability against phase separation and consisting essentially of (a) an alkoxyl quaternary ammonium compound corresponding to the formula

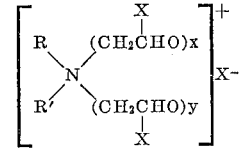

wherein R is an alkyl group of from about 12 to 18 carbon atoms, R' is an alkyl group of up to about 2 carbon atoms, X is selected from the group consisting of methyl and hydrogen radicals, x and y are integers of from 1 through 3, the sum of x and y being up to 4, and Y is an anion selected from the group consisting of methosulfate, ethosulfate, chloride, bromide, iodide, acetate and lactate, said quaternary ammonium compound being present in an amount of from about 0.7 to about 5 percent, (b) an alkoxyl amine corresponding to the formula

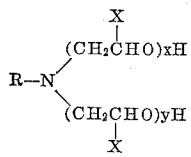

wherein R is an alkyl group of from about 8 to about 18 carbon atoms, X is selected from the group consisting of hydrogen and methyl radicals, x and y are integers of from 1 through 4, the sum of x and y being up to about 5, said alkoxyl amine being present in an amount of from about 0.7 to about 5 percent (c) a polishing abrasive having an average maximum diameter of from about 35 to about 45 microns, said abrasive being present in an amount of up to about 60 percent (d) an acid having an ionization constant of from about $1\times10^{-5}$ to about $1\times10^{-2}$ and being present in an amount of up to about 35 percent, (e) a silicone oil slip agent in an amount of from about 1 to 5 percent, (f) a water-insoluble solvent system in an amount of from about 9 to about 25 percent selected from the class consisting of hydrocarbons and halogenated hydrocarbons, for said amine and said quaternary compound, and for removal of grease from a metallic surface and (g) water in an amount of from about 15 to 60 percent, said percentages being by weight of the composition.

2. A metal cleaning and polishing emulsion according to claim 1, wherein said alkoxyl quaternary ammonium compound is N-coco, N-methyl, N,N-dipropoxyl ammonium methosulphate.

3. A metal cleaning and polishing emulsion according to claim 1, wherein said alkoxyl amine is N-triethoxyl, N-diethoxyl stearyl amine.

4. A metal cleaning and polishing emulsion according to claim 1, wherein said abrasive is particulate alumina, having an average maximum diameter of about 39 microns.

5. A metal cleaning and polishing composition according to claim 1, wherein there is present an emulsion stabilizer selected from the class consisting of silica and bentonite.

6. A metal cleaning and polishing composition according to claim 5, wherein when silica is present, said silica is present in amounts of up to about 5 percent; and when bentonite is present, said bentonite is present in amounts of up to about 10 percent.

7. A metal cleaning and polishing composition according to claim 1, wherein said acid is phosphoric acid.

8. A metal cleaning and polishing composition according to claim 1, wherein said water-insoluble solvent system is odorless mineral spirits.

9. A metal cleaning and polishing composition characterized by enhanced stability against phase separation and consisting essentially of (a) from about 0.7 to 5 percent of N-coco, N-methyl, N-N-dipropoxyl ammonium methosulfate, (b) from about 0.7 to 5 percent of N-triethoxyl, N-diethoxyl stearyl amine, (c) up to about 60 percent of alumina particles having an average maximum diameter of from about 35 to 45 microns, (d) up to about 35 percent of phosphoric acid, (e) from about 1 to about 5 percent of a silicone oil emulsion comprising 35 percent of a polysiloxane terminated with trimethyl silane, (f) odorless mineral spirits in an amount of from about 9 to about 25 percent and (g) water in an amount of from about 15 to about 60 percent, said percentages being by weight of the composition.

10. A process for preparing an emulsion of improved stability against phase separation consisting essentially of (a) dissolving from about 0.7 to about 5 parts by weight of an alkoxyl amine in from about 9 to about 25 parts by weight of a water-insoluble solvent selected from the class consisting of hydrocarbons and halogenated hydrocarbons, said alkoxyl amine corresponding to the formula

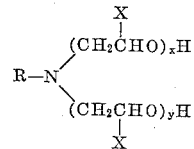

wherein R is an alkyl group of from about 8 to about 18 carbon atoms, X is selected from the group consisting of hydrogen and methyl radicals, x and y are integers of from 1 through 4, the sum of x and y being up to about 5, (b) dissolving in the resultant solution, from about 0.7 to about 5 parts by weight of an alkoxyl quaternary ammonium compound corresponding to the formula

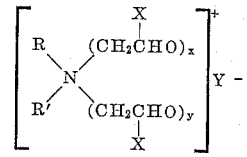

wherein R is an alkyl group of from about 12 to 18 carbon atoms, R' is an alkyl group of up to about 2 carbon atoms, X is selected from the group consisting of hydrogen and methyl radicals, x and y are integers of from 1 through 3, the sum of x and y being up to 4, and Y is an anion selected from the group consisting of methosulfate, ethosulfate, chloride, bromide, iodide, acetate and lactate, (c) adding to the resultant solution, up to about 60 parts by weight polishing abrasive particles having an average maximum diameter of from about 35 to about 45 microns, (d) preparing a separate mixture comprising from about 15 to about 60 parts by weight of water; a silicone oil slip agent in an amount of from about 1 to about 5 parts by weight; and up to about 35 parts by weight of an acid having an ionization constant of from about $1\times10^{-5}$ to about $1\times10^{-2}$ and (e) adding said separate mixture to said abrasive containing mixture while agitating said abrasive containing mixture thereby forming a stable emulsion said parts being by weight of the composition and, the sum total of all of the components of said emulsion being 100 parts by weight.

References Cited
UNITED STATES PATENTS

| | | | |
|---|---|---|---|
| 1,729,767 | 10/1929 | Dinley | 252—136 |
| 2,856,297 | 10/1958 | Geen | 106—3 |
| 2,937,149 | 5/1960 | Hilton | 252—136 |
| 3,124,536 | 3/1964 | Ware | 252—153 |
| 3,222,201 | 12/1965 | Boyle et al. | 106—3 |

LEON D. ROSDOL, *Primary Examiner.*

SAMUEL L. BLECH, *Examiner.*

J. T. FEDIGAN, *Assistant Examiner.*